I. CRUM.
Hand-Seeder.
No. 60,483.
Patented Dec 18, 1866.
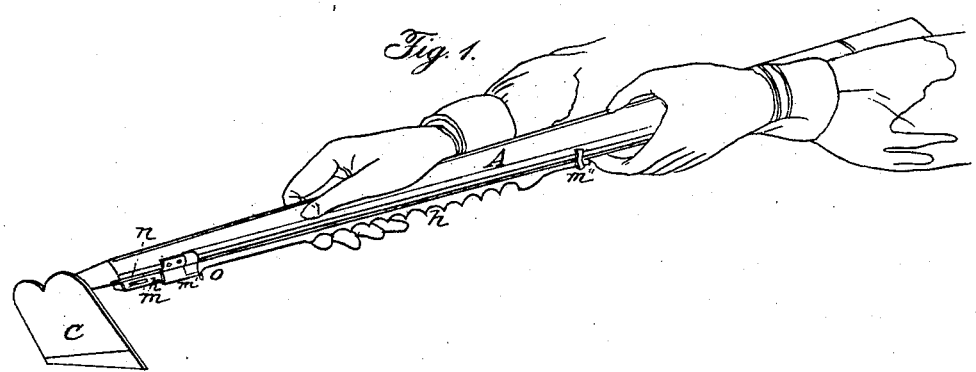
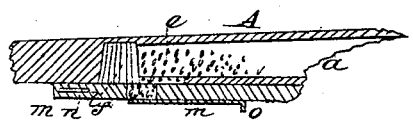
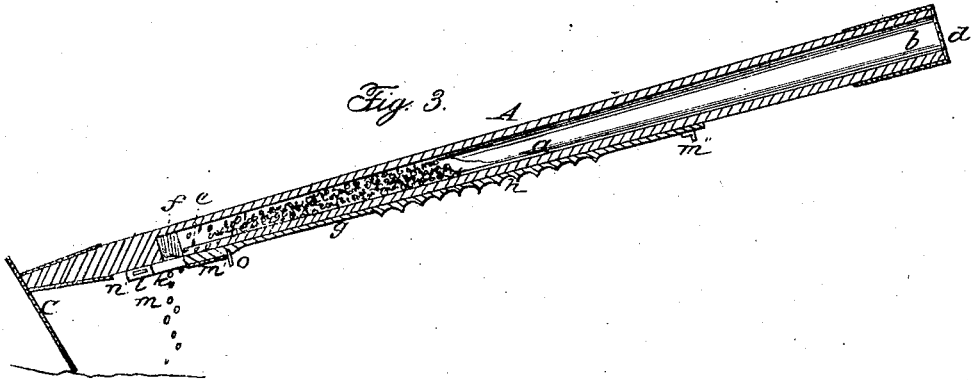
Witnesses:
John F. Christian
Norman G. Kenan
Inventor:
Isaac Crum

United States Patent Office.

IMPROVEMENT IN CORN-PLANTERS.

ISAAC CRUM, OF PORT UNION, OHIO.

Letters Patent No. 60,483, dated December 18, 1866.

*The Schedule referred to in these Letters Patent and making part of the same.*

TO ALL WHOM IT MAY CONCERN:

Be it known that I, ISAAC CRUM, of Port Union, Butler county, and State of Ohio, have invented a n and useful improvement in Corn-Planters, of which the following is a full and clear description, reference bei had to the accompanying drawings, forming part of this specification.

My invention relates to a device, by means of which grain of any kind may be fed from the hoe handle, the action of one of the hands upon the distributing-plate, conveniently placed beneath the hoe handle.

Figure 1 is a perspective view of my improved planter, in the hands of the operator.

Figure 2 is a sectional elevation, taken through the handle of the planter or hoe handle and distributi plate, showing the grain filling the aperture in the distributing-plate previous to its being dropped.

Figure 3 is a complete sectional elevation of my improved planter, taken longitudinally, the distributi plate having been moved to its second position, for the purpose of dropping the grain.

A is an ordinary hoe handle, tubed, $a$, from the but $b$ to a point near the hoe blade, $c$; the but $b$, of t handle A, is covered with a close-fitting cap, $d$. At the extreme end of tube $a$, and passing through the und side of handle A, at a point near the hoe blade, $c$, is aperture $e$; part of aperture $e$ is covered by brush $f$, of t same width as the aperture $e$. Beneath hoe handle A, and sliding freely upon its under surface, is distributi plate $g$, having a length nearly equal to that of the hoe handle; the end nearest but $b$ is corrugated, $h$, tra versely; the opposite end terminates in two prongs, $k$; a gauge-plate, $l$, large enough to cover aperture $e$, pivoted between prongs $k$ by clamping-bolt $m$, which passes through slots, $n$, in prongs $k$. Guide-plates $m'$ a $m''$ hold distributing-plate $g$ in close contact with handle A; a check-pin, $o$, limits the throw of plate $g$ in c direction.

*Operation.*

The tube $a$ of handle A having been filled with grain, the operator takes the implement in hand, in the sa manner as one does in ordinary hoeing; one hand is placed below the other, the fingers passing beneath t handle, and interlocking corrugations $h$ of distributing-plate $g$; the other hand grasps the but $b$ of handle As the hoe-blade $c$ is brought towards the ground, in order to cover the grain dropped, there is a drawing towa the body of the hands; the fingers of the further hand may be exercised in drawing up the distributing-plate that the space between prongs $k$ may be filled with grain. At the time that the hoe blade, $c$, is withdrawn fr the ground, and towards the person operating, the distributing-plate, $g$, is moved towards the hoe blade, $c$, t grain dropped to the ground, as shown in fig. 3; the brush keeps back the balance of the grain, and does t cut it or in any way bruise it. The space between the prongs $k$ may be enlarged by means of gauge-plate $l$ a clamping-bolt $m$; the slot $n$, in gauge-plate $l$, permits the moving, longitudinally back and forth, of bolt t the elasticity of prongs $k$ enables the operator to clamp securely in any desirable position the gauge-plate $l$. will be seen from the above description of the operation, that the dropping and covering of grain is accomplish in the same time that is now occupied in covering alone.

Having fully described the construction and mode of operating my improved corn-planter, I make t following claim:

In combination with a hoe, or its equivalent, having tube $a$, and aperture $e$, the distributing-plate $g$, c structed and operating as above described and set forth.

ISAAC CRUM.

Attest:
WM. DOEGEN,
CHAS. L. DOEGEN.